Patented Nov. 5, 1935

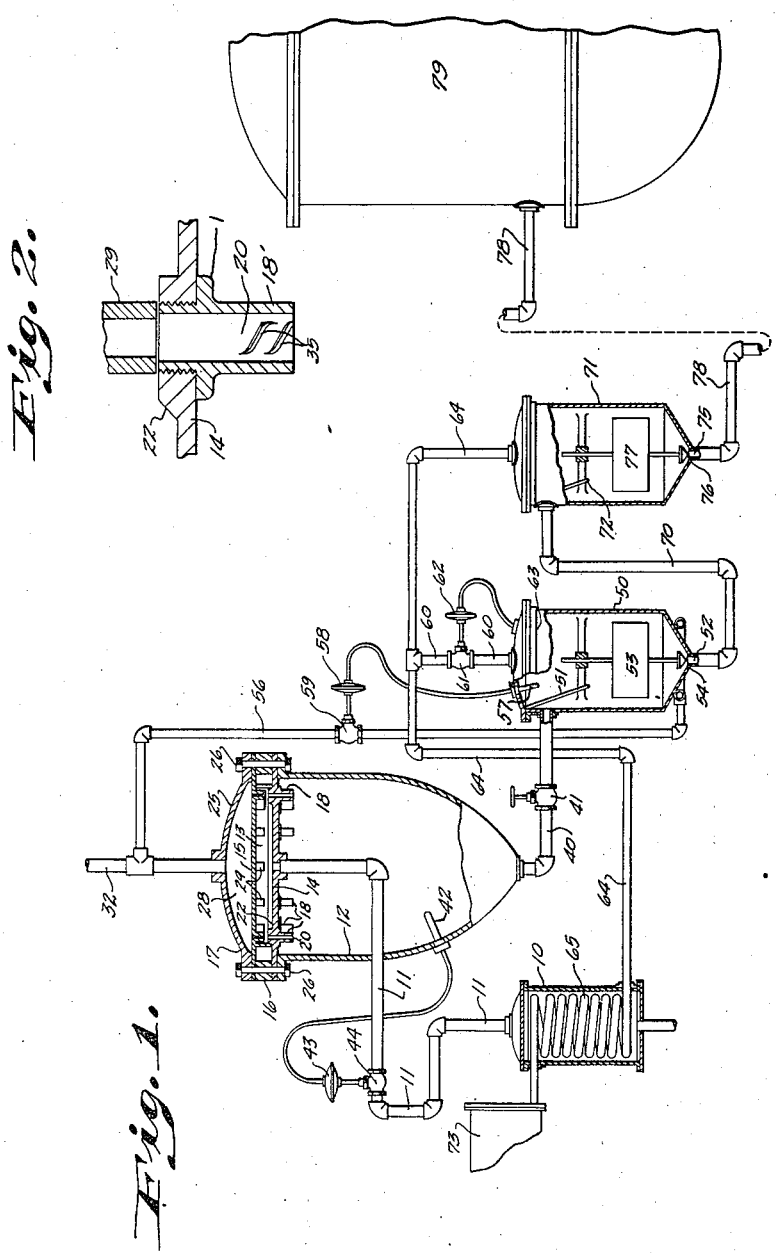

2,019,491

UNITED STATES PATENT OFFICE 2,019,491

APPARATUS FOR TREATING FOODS

George Grindrod, Oconomowoc, Wis., assignor to Grindrod Process Corporation, Waukesha, Wis., a corporation of Wisconsin Original application August 6, 1927, Serial No. 211,022. Divided and this application December 8, 1928, Serial No. 324,768. Renewed January 26, 1935

13 Claims. (Cl. 99—2)

My invention relates to improvements in apparatus for treating foods such as milk, cream, fruit juices and other liquid and semi-liquid foods or food products to preserve the same by sterilization and otherwise improve the food products for use, this application being a division of my former application Serial No. 211,022 filed August 6, 1927 and which has eventuated into Patent No. 1,819,023 for a process of treating foods.

Sterilization is destruction of living organisms, including spores. It necessarily involves the destruction of all living cells capable of performing life functions, particularly reproduction.

Heretofore, the principal agencies relied upon to effect sterilization were heat, life destroying chemicals and oxygen extracting and excluding agencies, the latter being, however, impractical for various reasons, as a commercial method where complete sterilization is required. The use of chemicals for the sterilization of food products is also not generally available in the treatment of foods and therefore the prevailing method of sterilizing foods is the thermal method, i. e.—that of subjecting the material to a temperature sufficient to destroy all life within a given period of time.

The thermal method has well recognized disadvantages due principally to the fact that the character, flavor and composition of the food is usually altered. In the sterilization of milk by the thermal method, the fat globules tend to break down and the albumen tends to coagulate. The customary practice is to raise the temperature of the food to a sterilizing temperature and maintain it at that temperature for about thirty minutes without materially increasing it beyond the degree necessary to complete the process within that period, although it has long been known that the process can be accelerated by increasing the temperature in cases where the nature of the food is such that higher temperatures may be employed without destroying or impairing the value of the product. But in the treatment of milk and allied food products, the time required to heat the food to the higher temperature, plus the time required to again cool it to a point where the deterioration in quality and flavor will be arrested, has been found to be of such duration as to preclude the use of the higher temperatures for such purposes. Therefore the moderate temperatures, requiring an interval of about thirty minutes to complete the process, are usually employed.

The problems indicated in the foregoing statement of prior art practice have caused me to seek other methods of sterilization in the practice of which, the quality, characteristics and flavor of the food will be less subject to change or impairment.

My experiments have led me to believe that steam particles moving at high velocity into material under relatively low pressure, may destroy living cells by friction and searing effects as well as by impact and heat.

By the process and apparatus herein disclosed I employ such high velocity steam jets to kill micro organisms present in the material being treated.

Biologists have pointed out that while all forms of life have certain degrees of adaptability to changes in environment, the power of adaptation is subject to limitations both as to time allowed for such adaptation and the degree of change required to meet the new environment. For example, a human being can survive changes in atmospheric pressure to only a very limited degree, if the changes are rapid, but to a much greater degree if the rate of change is slow enough to permit the human organism to adapt itself to such changes as they progress. I have found by experiment that bacterial life may readily become inured, (adapted), to high temperatures, which, if applied suddenly in a first instance, would destroy such life.

I have therefore been led to experiment with changes other than heat in the environment of bacterial life, and my experience has further led me to believe that it is possible to subject living cells and bacterial organisms to pressure and heat changes, both external and internal, of such a character as to require greater tenacity and resiliency, or power of resistance, than that possessed by the walls of any existing living cell or cellular tissues. My experiments also lead me to believe that while living tissue responds readily by expansion and contraction to gradual pressure changes, it readily ruptures if subjected to pressure and heat changes calling for a more rapid expansion or contraction than is required under the ordinary conditions to which such organisms are accustomed. Further, I have discovered that impactive pressures may be applied to small particles of material in such a manner that a single instantaneous application of such pressure, followed by a violent internal expansive reaction, may be relied upon to completely exterminate all life in such particle.

It is therefore an object of this invention to provide apparatus for subjecting foods such as milk and other materials capable of minute subdivision, to violent pressure changes and reactions so abruptly applied and of such a character as to destroy all bacterial life therein without materially affecting the food value, flavor and other characteristics of the food. Incidentally, I may use heat to produce the desired internal pressures and I also propose to utilize the internal heat mechanically generated by the application of external pressure, it being my purpose to apply such pressure and heat with a suddenness and violence capable of causing a rapid rise of internal temperature, with a consequent violent expansive reaction, the heat rise within the living cell being probably greater, and a high temperature more instantly developed than in the surrounding media, and greater than it is possible to attain by the heating agency externally applied during the same instant of time, for the reason that the heat of compression is added to the heat absorbed from the surrounding media.

It is a further object of my invention to devise apparatus for sterilization by pressure change, in which each particle of material and, as nearly as possible, each living cell therein, may be segregated and directly exposed to the cell destroying pressure and each living cell or organized group of cells destroyed in a single application of such pressure, or a single momentary exposure to such pressures and the temperature incident to such pressures and the means for applying them. Also I propose to envelop the segregated particles in a rapidly moving stream of hot steam or gas whereby successive particles of the heating medium are brought into contact with the particle to be heated. Also I propose to provide apparatus for effecting transfer of heat from the steam to the material being treated at a maximum rate.

It is my further object to provide apparatus capable of carrying out the steam treatment process, hereinbefore described, in a continuous manner whereby sterilizing and other results obtained may all be accentuated beyond anything heretofore accomplished in those particulars.
Further, it is my opinion that the time interval during which the material is exposed to destructive temperature conditions, may be greatly reduced and changes in chemical composition, flavor and other characteristics of the material may be more completely avoided by my new apparatus.

With reference to the preferred form or embodiment of my apparatus, it may be stated that objects of this invention are to deliver material in the form of a film or thin layer across the paths of a group of minute steam jets in such a manner that the material comprising the film is treated by the steam jets and is carried with the steam through a passage into a chamber from which the material may be continuously delivered; to provide for collecting and continuously delivering the material so treated under conditions which permit a degree of thermal sterilization, when desired, without interruption in the continuity of the process or in the continuous delivery of the sterilized material; to provide for an automatic regulation of such delivery for the purpose of temperature and pressure control; to provide for the utilization of a portion of the steam to prolong the maintenance of thermal sterilization in the material subsequent to its exposure to the treatment or impact of the previously mentioned particles by steam; to provide for a delivery of the sterilized or sterilizing material into a vacuum chamber in a stream which is substantially continuously moving but in which the movement may be regulated by brief interruption or otherwise in a manner to maintain substantial uniformity in the thermal treatment of all the particles of the material and to finally deliver the same into a reservoir in a thoroughly sterilized homogeneous condition and substantially in its natural condition except for increased dispersion and the absence of living organisms.

In the accompanying drawing:
Figure 1 illustrates a preferred form of apparatus for carrying out my improved process, the milk containers or chambers other than the final reservoir being illustrated in vertical section and the piping and controlling valves being illustrated conventionally.

Figure 2 is an enlarged fragmentary sectional view of one of the nozzles showing the means for twisting the jet.

Like parts are identified by the same reference characters in both views.

In the particular apparatus shown in the drawing, the material may be fed through a preheating or warming chamber 10, although this is not essential. From the warming chamber, the material passes to the sterilizer through a conduit which, in the drawing, is represented by the pipe 11.

The sterilizer comprises a chamber 12 which preferably has the general form of an inverted bell, capped by a generally horizontal wall 14, above which a similar wall 15 is supported by a ring 16 which, with the walls 14 and 15, forms a chamber or compartment 13. A concavo convex cap wall 17 has its outer margin bolted to the wall 15 and forms with the latter a steam chamber above the chamber 13. The material is conveyed by the pipe 11 upwardly in the chamber 12 and through a central port in the horizontal wall or partition wall 14 which forms the floor of the chamber 13. The floor 14 has an annular row of studs 22 extending upwardly and each stud 22 has a vertical threaded opening, shown in Figure 2. Threaded into the openings are nozzles 18' which provide communication between supply chamber 13 and the receiving chamber 12. The top surfaces of the nozzles 18' are shown flush with the top surfaces of the studs 22. Each of the nozzles 18' has a flange 1 to limit the extent to which the nozzles may be threaded into the openings in the floor 14, so that the aforementioned surfaces may be brought flush with each other.

The lower end of the nozzle 18' may be provided with internal helical rib 35 for a purpose hereinafter described.

Liquid material such as milk may be delivered into the chamber 13 through the pipe 11 and allowed to flow radially across the floor 14 thereof, and its depth slightly exceeds the height of the upwardly extending studs 22. As hereinafter explained, it will be allowed to flow across the upper ends of the studs 22 in the form of a film, from which particles may be successively broken and driven through the nozzle apertures by steam jets in the manner hereinafter described.

The partition, (horizontal wall 15), which separates chamber 13 from chamber 28, is provided with an annular row of apertures, the axes of which are alined with those of associated nozzle ports 20 in the floor 14 of chamber 13. Preferably, the floor 15 is provided with downwardly extending tubular studs 29 which form nozzles in registry with the apertures in the floor but of less diameter than the nozzle ports 20. The passages through the studs 29 are preferably made as small as is reasonably practical, consistent with the purpose of delivering steam at high velocity and sterilizing temperature against the film of liquid flowing across the upper ends of the studs 22. The exterior diameters of the studs 29 will preferably correspond with those of the nozzles 18.

The gap between the lower ends of the nozzles 29 and the upper ends of the nozzle studs 22 determines the thickness of the film of milk or other material to be fed into the path of the steam jets. If the studs 22 are in an annular row as shown in Fig. 1 they may be connected in the form of a continuous or substantially continuous rib projecting upwardly from the surface of the partition wall. In the construction shown, it may be assumed that the apertures through the steam jet nozzles 29 are approximately 0.05 of an inch in diameter. The ports 20 are somewhat larger in diameter or capacity, but specific dimensions are not mentioned for the reason that exactness in the diameter of these passages is not required. They are merely made large enough to reasonably allow the passage of the steam and to allow particles of milk or other material to pass freely through them, while probably separating into a non-supporting relation to each other. These passages 20 are axially aligned with those of the steam jet nozzles 29. Any desired number of registering nozzles may be provided within the capacity of the receiving chamber 12 and its outlet to handle the delivered material.

Steam is delivered into the chamber 28 from any suitable source of supply through a pipe 32 and is preferably delivered at a pressure of approximately 100 lbs. per square inch and at a temperature in excess of 300° F. The liquid or material delivered into the chamber 13 passes between the adjacent ends of the nozzles 29 and studs 22 and the particles of the film flowing over the tops of the studs 22 are continuously struck by steam escaping from the nozzles 29 and driven into the chamber 12. One of the nozzle ports 20 is illustrated in the enlarged sectional view, Fig. 2, and shows a short length of helical blade 35 at the mouth of the nozzle for the purpose of producing a whirling spray or imparting to the jet a helical twist as it enters the chamber 12. An outlet duct 40 leads from the bottom of the chamber 12 and has a capacity which is initially insufficient to carry off the liquid as rapidly as it is delivered through the nozzle ports 20. The capacity of the duct 40 may be regulated by a gate valve 41. As the liquid accumulates in the chamber 12 some pressure develops in this chamber, but in order to prevent the development of excess pressure and temperature in the chamber 12, I preferably employ an automatic temperature controller 42 which has its bulb connected with a diaphragm chamber 43, the diaphragm of which controls a valve indicated at 44 in the supply pipe 11. By thus controlling the quantity of milk or other material to be delivered to the apparatus, it is possible to control both temperature and pressure within the chamber 12, for by reducing the quantity of milk delivered, accumulation beyond a desired level in the chamber 12 may be prevented and the more nearly empty this chamber becomes, the greater will be the expansion of the steam and the consequent reduction of temperature and pressure.

The object of allowing an accumulation of milk or other material in the chamber 12 is partially to prevent the escape of steam through the outlet 40 but also to allow sterilizing temperature to be maintained in the chamber 12 so that the material may be subjected to a degree of thermo-sterilization for a short period following the initial steam treatment when delivered to the nozzle ports 20. This may not be essential, but I preferably employ this means for a supplemental thermo-sterilization as a matter of precaution.

I have found that I increase the efficiency of my apparatus by making each steam jet of minimum practical size and multiplying the number of the nozzles and jets (the efficiency of the jet increases in proportion to the reduction in its diameter as long as the jet nozzle remains effective to deliver steam at the required velocity). My opinion regarding the reason for the increase in the efficiency brought about by reducing the size of each jet to a minimum is that the destruction of living cells is largely, if not almost wholly, accomplished at the surface of the jet where the impacts necessarily occur. The frictional and searing contacts also occur at the surface of the jet for after the inertia of the particle of material or the living tissue or the living cell has been overcome and the particle entrained within the jet, the effect will be thermal and the principal difference in operation as compared with ordinary methods of thermal sterilization will then reside in the fact that the particle may be enveloped in steam at a higher temperature than that employed for ordinary thermal sterilization, although for a much shorter period.

It is further my opinion that before a particle of the material can be so entrained and carried along with the steam jet, the results of impact, friction, and the rapid heat transfer induced by the flowing steam will have raised the temperature of that particle of material to a point nearly, if not quite, equal to that of the steam, and the rapidity of this rise in temperature is far beyond the power of adaptation of living tissue or cell walls to withstand, especially while the cell walls are being subjected to the coincident strains.

With a steam jet 0.05 of an inch in diameter, the ratio of cross sectional area to circumference is 1:80, whereas in a larger jet, such for example as a jet 0.375 of an inch in diameter, the ratio of cross sectional area to circumference is only 1 to 10.56. An ideal condition would be realized if it were practical to subject the milk to the action of a steam jet of not exceeding twice the diameter of a bacterial spore, i. e., about four microns, upon a milk film of substantially the same thickness.

The object of preheating the material in the chamber 10 is to reduce condensation and utilize the heat of the steam most effectively, but it is not desirable to raise the temperature of milk beyond 160° F. in the chamber 10 if thermal chemical change is to be avoided as fully as possible.

If desired, additional supplemental provision may be made for further thermo-sterilization. In the drawing, I have illustrated a secondary chamber 50 which receives the material from the pipe 40, the baffle 51 being employed to throw the material downwardly within this chamber toward the outlet 52 at the bottom thereof. I have provided a float 53 in this chamber which controls an outlet valve 54 whereby the material in the chamber may be discharged whenever it accumulates to such an extent as to lift the float and whereby such discharge will be checked whenever the level of the material falls to such an extent that the float allows the valve to close.

Steam may be admitted to the chamber 50 directly from the pipe 32 through the branch pipe 56, the flow of steam being regulated by the temperature controller 57 with its associated diaphragm chamber 58 in control of the steam pipe valve 59.

The escape of steam from the chamber 50 may also be permitted through a pipe 60 having a valve at 61 controlled by a diaphragm at 62 operated by the temperature controller bulb 63.

The steam delivered through the pipe 60 may be conveyed by a pipe 64 to a coil 65 in the prewarming chamber 10, thereby supplying the heat for prewarming purposes.

In the construction shown, the chamber 50 discharges its liquid or other material through a pipe or duct 70 into an expansion chamber 71 where a baffle 72 again directs it toward the bottom of this chamber. The pipe 64 leads from the top of this chamber and allows a free and unobstructed escape of the steam to a condenser indicated at 73. Therefore, the interior of the chamber 71 may be without pressure, the degree of vacuum in the condenser extending thereto. The outlet 75 of the chamber 71 is provided with a valve 76 controlled by a float 77 whereby the contents of this chamber will be intermittently discharged through a pipe or duct 78 into a reservoir or receiver 79 which may also be assumed to be under vacuum. The reservoir 79 may also be assumed to be located below the level of the chamber 71 whereby the liquid will flow into the reservoir 79 by gravity.

The operation of the apparatus will be understood from the foregoing description but it will be obvious that the structure may be modified almost indefinitely without departing from the scope of the invention as claimed. The terms and expressions contained in this specification and in the appended claims are used for the purposes of description and not of limitation and while I have shown a structure in which the material is delivered through a series of chambers, I do not intend to indicate that such a series of chambers is essential.

I am aware of the fact that materials have been subjected to the direct action of steam in an effort to sterilize such materials and that pasteurization and partial sterilization has at times been accomplished, but for the purposes herein set forth, complete sterilization may frequently be essential and in order to accomplish complete sterilization or in order to accomplish any degree of sterilization instantly it is necessary to do something more than to merely inject steam in a haphazard fashion into the body of the liquid to be treated. In my former application Serial Number 734,566 which has matured into Patent No. 1,714,597 I have described a batch method of treating materials in which I employ high velocity steam jets under conditions which cause such a violent agitation of the material as to cause substantially all particles to move into contact with steam jets at least once during the course of the treatment and have thus effected complete sterilization in such a brief interval as to avoid material chemical and flavor change.

But in this application and that from which it is divided, I believe I am first to disclose means for providing a continuous process for the presentation of material to high velocity steam jets in a manner to systematically subject to direct single or simultaneous impact, each particle, and each living organism, for direct contact and destruction, whereby, as to each particle the operation may be completed in a minimum period of time.

I also believe that I am the first to provide for such direct contact of the steam with successive small particles of material at a velocity capable of imparting destructive impacts to the organisms contained in such particles, irrespective of actual contact of the steam with each cell and coupled with such a rapid change in temperature and internal temperature and expansion as to make adaptation impossible and ensure destruction of life within the liquid so treated.

I also believe that I am the first to provide for applying to particles of material sudden pressures or impacts under conditions which not only tend to rupture the cells by the direct force applied thereto, but which allow the particles to be forcibly separated and freed from the support of surrounding media while such force is overcoming their inertia and which therefore permit such violent internal reactive expansion and to virtually explode unruptured or imperfectly ruptured cells.

In my former Patent No. 1,461,653, dated July 10, 1923, I have disclosed in Figure 11 of the drawing thereof multiple steam nozzles adapted to operate on the principle of an atomizer to draw by suction liqui-form material such as fats or milk, or a mixture of fats and milk, into tubular passages which are sufficiently large to serve as vertically disposed cylindrical expansion chambers in which the particles of fat are first drawn by suction into an eddying atmosphere surrounding the jets of steam, and in which they gradually acquire momentum, becoming finally entrained with the expanding jet of steam and driven through the outlets of the expansion chambers in the form of a spray. Some slight thermal pasteurizing effects might be obtained if the expansion chambers were made of considerable length, but no provision was made for maintaining a sterile atmosphere nor sterility in the body of liquid in the receiving chamber.

But by the invention herein disclosed the film of material to be steam treated is received between the horizontal surfaces of the ends of the steam nozzles and the opposing ends of the receiving nozzles, as best indicated in Figure 2, and the particles of milk are not drawn in by suction but are fed directly into frictional contact with impacting particles of steam before being permitted to acquire momentum in the direction in which the steam is flowing and before the steam has been permitted to expand and allow its high temperature or any material portion of its velocity to become dissipated.

In this manner each minute particle of milk may be directly subjected to impact of a particle of steam having exceedingly high temperature and a cell rending velocity.

In the improved apparatus described in this application, the ports 20 have a capacity substantially equal to or but little greater than the capacity of the steam jet nozzles plus that required for the added quantity of milk, and inasmuch as the particles of milk are impacted and instantly driven through these ports 20 into the receiving chamber, they can be subjected to an exceedingly high momentary temperature and driven into the receiving chamber without coagulation, whereas in the structure disclosed in my said former patent, No. 1,461,653, the temperature of the steam employed, the relative sizes of the steam nozzles, and the expansion chambers, and the structure and arrangement of the receiving chamber, all constitute part of an organization in which coagulation of the protein in the steam treated material was sought in order to build up molecular aggregates of coagulating albumen upon the fat nuclei.

By the structure herein disclosed I am enabled to not only continuously carry on the steriliza- tion of milk and similar materials by invoking the impact principle disclosed in my said Patent No. 1,714,597, granted upon a companion application, but I am also able to more uniformly expose every particle of the material to such impact and to subject it to but one such exposure with the exceedingly high temperature incident thereto. Also, I am able to maintain the temperature of the liquid in the receiving chamber 12 at an exceedingly low sterilizing temperature, just sufficient to ensure a sterile atmosphere in said chamber, and as the proteins of the milk or other material have been dispersed and stabilized against coagulation, and as they also pass out of the receiving chamber into the vacuum chamber within a very short period of time, cooking can be very completely avoided and reinfection made impossible.

I claim:

1. Sterilizing apparatus comprising the combination with a receiving chamber having a top wall provided with nozzles extending into said chamber, of means for distributing the material to be sterilized in the form of a film over said wall in a position to be projected through said nozzles into said chamber and means for directing jets of steam at a sterilizing temperature and a dispersing velocity against said film at the inlet ends of said nozzles to carry particles from the film through said nozzles, and a receiving chamber provided with a controllable outlet adapted to permit sterilizing temperatures, corresponding pressures and volume control within the chamber.

2. Sterilizing apparatus comprising the combination with a feeding chamber and associated receiving chamber for the material to be sterilized, of a series of nozzles communicating between said chambers, steam ports of less diameter than said nozzles and aligned therewith for directing jets of steam at a sterilizing temperature into said nozzles, means for feeding the material to be sterilized in thin films transversely into the paths of said steam jets, and controllable means for continuously discharging said material from the receiving chamber into a vacuum chamber.

3. Sterilizing apparatus comprising the combination with a receiving chamber having multiple inlet ducts in its top and an outlet in its bottom portion, of a feeding chamber enclosing the upper ends of the inlet ducts, a superposed steam chamber provided with nozzles axially aligned with said ducts but of less diameter, means for constricting the outlet of the receiving chamber sufficiently to allow a moderate pressure and low sterilizing temperature to build up in the receiving chamber before the outflow balances the inflow and means for maintaining a supply of liqui-form material in the feeding chamber at a level to flow in a thin layer into the paths of the steam jets.

4. Sterilizing apparatus comprising the combination with a receiving chamber having multiple inlet ducts in its top and an outlet in its bottom portion, of a feeding chamber enclosing the upper ends of the inlet ducts, a superposed steam chamber provided with nozzles axially aligned with said ducts but with nozzle apertures of less diameter, and means for maintaining a supply of liqui-form material in the feeding chamber and for forcing it to flow in a thin layer substantially horizontally into the paths of the steam jets, said receiving chamber being provided with temperature controlled means for regulating the rate of delivery to the feeding chamber, and the size of the receiving chamber outlet being so proportioned to the total capacity of the inlets as to provide both temperature and pressure regulation in the receiving chamber by said regulation of the rate of delivery.

5. Sterilizing apparatus comprising the combination with a feeding chamber and associated receiving chamber for the material to be sterilized, of a series of nozzles communicating between said chambers, steam nozzles of less capacity than the first mentioned nozzles and disposed for directing jets of steam into said first mentioned nozzles, means for feeding the material to be sterilized in minute particles transversely into the paths of said steam jets, and means for continuously discharging said material from the receiving chamber into a vacuum chamber, and means for controlling the volume, temperature and pressure in the receiving chamber by controlling the relative rates of delivery to and from said chamber.

6. In a sterilizing apparatus, a feeding chamber having depending steam jet nozzles in one of its walls and alined nozzles in an opposite wall, the inlet ends of which latter nozzles extend upwardly from the last named wall into close proximity to the outlet ends of the steam nozzles, the diameters of said aligned nozzles being so proportioned to the diameters of the steam jet nozzles as to allow particles of material to be fed directly along transverse lines into positions for frictional impactive contact therewith by particles of steam moving at sufficient relative speed to destroy living cells by impact, heat, and frictional effects and to stabilize proteins by dispersion, the opposing surfaces of said nozzles being substantially parallel in planes substantially perpendicular to the axes of the nozzles, and a receiving chamber, a valve controlled outlet in said receiving chamber adapted to maintain therein a sterilizing temperature.

7. Apparatus for sterilizing milk and other materials, comprising the combination with a source of steam supply, of a nozzle adapted to deliver the steam from the nozzle at a high sterilizing temperature and cell destroying velocity, means for feeding liquid material in the form of a thin film substantially transversely into frictional and impact receiving contact of its particles with the steam, a receiving nozzle for the steam and liquid material so impacted having its inlet in registration with and spaced from the outlet of the steam nozzle, and a receiving chamber at the delivery end of the receiving nozzle having an outlet in its bottom portion and otherwise closed to allow a sterile atmosphere to be maintained therein.

8. Apparatus for sterilizing milk and other materials consisting in the combination with a steam chamber having a wall provided with nozzles for delivery of steam at high temperature and velocity, a second chamber provided with means for feeding the material to be treated into frictional contact with said steam jets and uniformly, as to substantially all particles of such material, for dispersing impacts of particles of steam upon the particles of materials, and a receiving chamber provided with inlet passages aligned with said steam nozzles and adapted to permit delivery of the impacted material from the second chamber into the receiving chamber, said receiving chamber being adapted to allow a sterilizing temperature to be maintained therein and having a valve controlled bottom outlet connected with a vacuum chamber.

9. In a sterilizing apparatus of the described class, the combination with a steam jet nozzle, of an aligned receiving nozzle of slightly greater diameter having its inlet end in proximity to the outlet end of the steam nozzle, and provided with helical baffles in its outlet end portion.

10. Apparatus for continuously sterilizing liqui-form materials, comprising the combination with a steam chamber, of a set of steam nozzles adapted to deliver steam from said chamber at a sterilizing temperature and cell rupturing velocity, means for continuously feeding a thin film-like layer of liqui-form material across the path of the steam in positions to be impacted and frictionally dispersed thereby, and means for controlling the passage of the material into a sterile cooling chamber while protecting it from recontamination.

11. A chamber having an inlet port and adapted to be kept sterile, in combination with an injecting nozzle associated with the inlet port, means for delivering to the nozzle an elastic fluid at a sterilizing temperature, and means for feeding a film of liqui-form material transversely into the path of the jet delivered through said nozzle to be driven by the jet through said inlet port, said chamber having a valved outlet adapted to regulate the pressure within said chamber and to regulate passage of the contents therefrom.

12. In sterilizing apparatus of the class described, in combination, a steam jet nozzle having inlet and outlet ends, helical baffles in the said outlet end, and means for ejecting material to be treated into the path of the jet of steam of said steam jet nozzle.

13. Apparatus for sterilizing milk and other materials, comprising the combination with a source of steam supply of a nozzle adapted to deliver steam therefrom at a high velocity, means for feeding liquiform material at a uniform rate and in the form of a film substantially transversely into frictional and impact contact with the steam jets, a receiving nozzle for the steam and liquid material so impacted, the inner diameter of the receiving end of the receiving nozzle being less than the outer diameter of the delivery end of the associated steam nozzle, and the receiving end of said receiving nozzle being separated from the delivery end of its associated steam nozzle by a distance equivalent to the thickness of the film, and a receiving chamber at the delivery end of the receiving nozzle having an outlet in its bottom portion and otherwise closed to allow a sterile atmosphere to be maintained therein.

GEORGE GRINDROD.